(12) United States Patent
Crafton et al.

(10) Patent No.: US 7,671,130 B2
(45) Date of Patent: Mar. 2, 2010

(54) THERMOPLASTIC ELASTOMERS HAVING IMPROVED ADHESIVE PROPERTIES

(75) Inventors: Justin Crafton, Wadsworth, OH (US); Jim Johnson, Akron, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 132 days.

(21) Appl. No.: 11/086,093

(22) Filed: Mar. 22, 2005

(65) Prior Publication Data

US 2006/0135693 A1  Jun. 22, 2006

Related U.S. Application Data

(60) Provisional application No. 60/636,577, filed on Dec. 16, 2004.

(51) Int. Cl.
*C08L 53/02* (2006.01)
(52) U.S. Cl. .............. 525/88; 525/92 C; 525/89; 525/98; 525/99
(58) Field of Classification Search .......... 525/88, 525/92 C, 89, 98, 99
See application file for complete search history.

(56) References Cited

U.S. PATENT DOCUMENTS

| 3,037,954 A | 6/1962 | Gessler et al. |
|---|---|---|
| 4,130,535 A | 12/1978 | Coran et al. |
| 4,957,968 A | 9/1990 | Adur |
| 5,002,625 A | 3/1991 | Naritomi |
| 5,051,474 A | 9/1991 | Warren et al. |
| 5,472,782 A | 12/1995 | Naritomi |
| 5,842,577 A | 12/1998 | Stevens et al. |
| 5,852,118 A | 12/1998 | Horrion |
| 5,910,540 A | 6/1999 | Takahashi |
| 6,207,752 B1 | 3/2001 | Abraham |
| 6,217,961 B1 | 4/2001 | Hert et al. |
| 6,291,587 B1 | 9/2001 | Bleys |
| 6,503,984 B2 | 1/2003 | Johnson |
| 2003/0083434 A1 | 5/2003 | Ouhadi |
| 2003/0138655 A1* | 7/2003 | Watanabe et al. ........... 428/523 |
| 2004/0077791 A1 | 4/2004 | Issum et al. |

FOREIGN PATENT DOCUMENTS

| EP | 0 928 808 | 7/1999 |
|---|---|---|
| GB | 1 581 167 | 6/1976 |
| JP | 1996041316 A | 2/1996 |
| JP | 1996041317 A | 2/1996 |
| WO | WO 01/109550 | 2/2001 |
| WO | WO 01/55257 | 8/2001 |
| WO | WO 2005/035683 | 4/2005 |

\* cited by examiner

*Primary Examiner*—Jeffrey C Mullis

(57) ABSTRACT

This document relates to adhesive compositions comprising 1) a thermoplastic vulcanizate of thermoplastic polyurethane and at least partially crosslinked rubber, and 2) an adhesion modifying amount of styrenic block copolymer. These compositions are especially useful in adhering to polar engineering thermoplastics and so find utility in laminates and composite articles comprising at least one polar engineering substrate and the described adhesive compositions.

5 Claims, No Drawings

THERMOPLASTIC ELASTOMERS HAVING IMPROVED ADHESIVE PROPERTIES

This application claims priority from U.S. Provisional Application 60/636,577, filed Dec. 16, 2004.

BACKGROUND OF THE INVENTION

1. Field of the Invention

This invention relates generally to thermoplastic elastomer (TPE) materials. Thermoplastic elastomers are broadly defined as rubber-like materials that, unlike vulcanized rubbers, can be processed and recycled like thermoplastic materials, yet have properties and performance similar to that of vulcanized rubber at service temperatures. A particularly useful subset of thermoplastic elastomers is those prepared as dynamically vulcanized alloys, or thermoplastic dynamic vulcanizates ("TPV" compositions). The invention more specifically relates to thermoplastic elastomer TPV compositions that have been modified for improved adhesion to polymeric substrates, and particularly with respect to polar engineering thermoplastics.

2. Description of the Prior Art

Polymer blends which have a combination of both thermoplastic and elastic properties can be obtained by combining a thermoplastic resin with an elastomeric material in a way such that the elastomer is intimately and uniformly dispersed as a cross-linked, discrete particulate phase within a continuous phase of the thermoplastic. Early work with the vulcanization of the elastomer phase is found in U.S. Pat. No. 3,037,954 which discloses static vulcanization, as well as dynamic vulcanization wherein a vulcanizable elastomer is dispersed into a resinous thermoplastic polymer and the elastomer is cured (crosslinked) while continuously mixing and shearing the blend. U.S. Pat. No. 4,130,535 discloses thermoplastic elastomer compositions comprising thermoplastic olefin resins and olefin copolymer rubbers, prepared by dynamic vulcanization and wherein the rubber component is vulcanized to the extent that it is essentially insoluble in conventional rubber solvents.

The thermoplastic phase of TPV compositions can be principally composed of any of a number of other thermoplastics, not just the thermoplastic olefins mentioned above. U.S. Pat. No. 6,207,752 describes TPV compositions comprising carboxylated-nitrile rubber and thermoplastic polyurethane to achieve low oil absorbance, non-stickiness, and ready processing characteristics. U.S. Pat. No. 6,291,587 describes thermoplastic vulcanizates comprising a thermoplastic polyurethane not having a major glass transition temperature less than 60° C., and a cross-linked, non-polar rubber, such as an ethylene-propylene-diene rubber. It further suggests generally that properties can be improved by the addition of compatibilizers. International Pat. Applic. No. WO 01 10950 (A1) describes thermoplastic vulcanizates comprising a thermoplastic polyurethane having a major glass transition temperature less than 60° C., and a cross-linked, non-polar rubber, such as an ethylene-propylene-diene rubber. It further suggests generally that properties can be improved by the addition of compatibilizers.

Specific efforts to improve the adhesive properties of thermoplastic elastomers have been made through the incorporation of functionalized thermoplastic resins into the blends. One approach is described in U.S. Pat. No. 4,957,968. The description discloses the addition of a functionalized polyolefin to improve adhesion to metals and polar polymers. Further, U.S. Pat. No. 6,503,984 describes a combination of a low flexural modulus and low crystallinity polyolefin and a functionalized polyolefin that was found to result in an olefin composition with excellent adhesion to metals and polar polymers (e.g. polyesters, polyamides, etc) especially fibers therefrom. U.S. Pat. No. 5,852,118 addresses block copolymers of polyolefins with polyurethanes, copolyesters, or copolyamides for improving adhesion of a typical polyolefin based TPV to polar engineering thermoplastics. U.S. Patent Applic. No. 2003/0083434 A1 describes adhesive compositions containing 25 to 95 wt. % thermoplastic elastomer and from 10 to 75 wt. % of a specific block copolymer, wherein the thermoplastic elastomer contains a polyolefin thermoplastic and a cross-linked olefinic rubber, optionally with 10 to 50 wt. % thermoplastic polyurethane.

Despite these solutions for adhering TPV compositions to polymer substrates, and particularly to polar engineering thermoplastic substrates, further improvements in bonding strength with compositions having excellent TPV engineering properties are still being sought.

SUMMARY OF THE INVENTION

The present invention is based on the discovery that a thermoplastic elastomer composition having improved adhesion is provided by a TPV composition comprising as the major part of the thermoplastic phase a thermoplastic polyurethane having a glass transition point less than 60° C. and an elastomeric phase with a major part of at least one, at least partially cross-linked rubber; and, in addition thereto a styrenic block copolymer (SBC). In detail the present invention relates to an adhesive composition comprising (a) from 75 to 97 weight percent of the total composition of a thermoplastic vulcanizate comprising i) from 50 to 86.6 weight percent, based upon the weight of i) plus ii), of a thermoplastic polyurethane having a glass transition point less than 60° C. and ii) from 13.4 to 50 weight percent, based upon the weight of i) plus ii), of an at least partially cross-linked rubber; and, (b) from 3 to 25 weight percent of the total composition of a styrenic block copolymer. Preferably the adhesive composition of the invention will be essentially free of crystalline or semi-crystalline thermoplastic polyolefins, such as the prior art polypropylene and polyethylene, homo- and copolymers.

In a further embodiment the present invention relates to a method for the preparation of an adhesive composition comprising melt processing in the presence of a cross-linking agent under conditions of dynamic vulcanization i) a thermoplastic polyurethane, ii) a cross-linkable or cross-linked rubber; melt blending with the product of a), iii) a styrenic block copolymer before, during or after substantial completion of the dynamic vulcanization.

A further embodiment of the invention provides composite structures comprising the adhesive compositions above adhered to at least one polar engineering substrate, such as, a shaped article comprising at least one layer of a polar engineering thermoplastic substrate which is at least partially in adherent contact with the adhesive composition of the invention.

DESCRIPTION OF THE PREFERRED EMBODIMENTS

Thermoplastic Vulcanizate

Thermoplastic Polymer Component

The thermoplastic polyurethane (TPU) included in the thermoplastic vulcanizate component of the invention adhesive composition is prepared from substantially difunctional ingredients, i.e. organic diisocyanates and components being substantially difunctional in active hydrogen containing groups, such that it has at least 1 major Tg of less than 60° C. However, often minor proportions of ingredients with functionalities higher than two may be employed. This is particularly true when using extenders such as glycerol, trimethylol propane, and the like. Any of the TPU materials known in the art within this description can be employed within the scope of the present invention.

The preferred TPU is a polymer prepared from a mixture comprising at least one organic diisocyanate, at least one polymeric diol and at least one difunctional extender. The TPU can be prepared by prepolymer, quasi-prepolymer or one-shot methods commonly used in the art.

Typically the thermoplastic polyurethane of the invention is obtained by reaction of a diisocyanate with macroglycol (s) and chain extender (s) at an isocyanate index of 95 to 105, preferably 98 to 102. Suitable thermoplastic polyurethanes may also be obtained by blending different polyurethanes in such amounts that the blend has at least 1 major Tg of less than 60° C. For further detail of such thermoplastic polyurethane, see International Pat. Applic. No. WO 01 10950 (A1) (above) and references cited therein, the TPV description therein being incorporated by reference.

Cross-linkable or Vulcanizable Rubber Component

Suitable monoolefin copolymer rubbers include non-polar, rubbery copolymers of two or more $C_2$-$C_{10}$ alpha-monoolefins, preferably ethylene with $C_3$-$C_8$ alpha-monoolefins, preferably copolymerized with at least one polyene, usually a $C_5$-$C_{20}$ diene. Saturated monoolefin copolymer rubber, for example ethylene-propylene copolymer rubber (EPM) can be used. However, unsaturation-containing monoolefin rubber such as EPDM rubber is more suitable. EPDM is a terpolymer of ethylene, propylene and a nonconjugated diene. Satisfactory non-conjugated dienes include vinyl norbornene (VNB), 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; and dicyclopentadiene (DCPD).

Butyl rubbers are also useful in the thermoplastic elastomer compositions. As used in the specification and claims, the term butyl rubber includes copolymers of an isoolefin and a conjugated diolefin, terpolymers of an isoolefin with or without a conjugated diolefin, divinyl aromatic monomers and the halogenated derivatives of such copolymers and terpolymers. Copolymers of a majority of isobutylene and a minority of isoprene, e.g, less than about 5 wt. %, make up the majority of commercial butyl rubber. The halogenated versions thereof are particularly useful, especially brominated butyl rubber (bromobutyl rubber). Another suitable copolymer within the scope of the olefin rubber of the present invention is a copolymer of a $C_{4-7}$ isomonoolefin and a para-alkylstyrene, and preferably a halogenated derivative thereof. The amount of halogen in the copolymer, predominantly in the para-alkylstyrene, is from 0.1 to 10 weight percent A preferred example is the brominated copolymer of isobutylene and para-methylstyrene. See U.S. Pat. No. 5,162,445.

Rubber components can also be natural rubbers or synthetic homo or copolymers of at least one conjugated diene with an aromatic monomer, such as styrene, or a polar monomer such as acrylonitrile or alkyl-substituted acrylonitrile monomer(s) having from 3 to 8 carbon atoms. Those rubbers are higher in unsaturation than EPDM rubber or butyl rubber. These rubbers can optionally be partially hydrogenated to increase thermal and oxidative stability. Desirably those rubbers have at least 50 weight percent repeat units from at least one conjugated diene monomer having from 4 to 8 carbon atoms. Other comonomers desirably include repeat units from monomers having unsaturated carboxylic acids, unsaturated dicarboxylic acids, unsaturated anhydrides of dicarboxylic acids, and include divinylbenzene, alkylacrylates and other monomers having from 3 to 20 carbon atoms.

The synthetic rubber component can be nonpolar or polar depending on the comonomers. Examples of synthetic rubbers include synthetic polyisoprene, polybutadiene rubber, styrene-butadiene rubber, butadiene-acrylonitrile rubber, etc. Amine-functionalized, carboxy-functionalized or epoxy-functionalized synthetic rubbers may be used, and examples of these include maleated EPDM, and epoxy-functionalized natural rubbers. These materials are commercially available. Non-polar rubbers are preferred; polar rubbers may be used but may require the use of one or more compatibilizers, as is well known to those skilled in the art.

Additives

The thermoplastic elastomer may optionally contain reinforcing and non-reinforcing fillers, plasticizers, antioxidants, stabilizers, rubber processing oils, extender oils, lubricants, antiblocking agents, antistatic agents, waxes, foaming agents, pigments, flame retardants and other processing aids known in the rubber or plastics compounding arts. Such additives may comprise up to 65 weight percent, more preferably up to 50 weight percent, of the total composition. Fillers and extenders which can be utilized include conventional inorganics such as calcium carbonate, clays, silica, talc, titanium dioxide, carbon black and the like. The rubber processing oils generally are paraffinic, napthenic or aromatic oils derived from petroleum fractions, or polymerized from hydrocarbon monomers derived thereby. The oils are selected from those ordinarily used in conjunction with the specific rubber or rubber component present in the composition and are generally present in amount equal to 20-200 parts per hundred parts rubber.

Processing

The olefin rubber component of the olefinic thermoplastic elastomer is generally present as small, i.e. micro size, particles dispersed within a continuous polyolefin matrix, although a co-continuous morphology or a phase inversion is also possible depending upon the amount of rubber relative to thermoplastic resin and the degree of vulcanization, if any, of the rubber. The rubber is to be at least partially vulcanized, and most preferably it is fully vulcanized (crosslinked).

The partial or full crosslinking can be achieved by adding an appropriate rubber curative to the blend of thermoplastic polyurethane and rubber, and vulcanizing the rubber to the desired degree under vulcanizing conditions. It is preferred that the rubber be crosslinked by the process of dynamic vulcanization. As used in the specification and claims, the term dynamic vulcanization means a vulcanization or crosslinking (curing) process wherein the rubber is vulcanized under conditions of shear at a temperature above the melting point of the thermoplastic polyurethane component during melt processing of the blend of thermoplastic and rubber. Such conditions are well-known, see for example the prior art discussed above, the disclosures of which, those relating to dynamic vulcanization, are incorporated by reference. See, also, S. Abdou-Sabet, R. C. Puydak, and C. P. Rader, "Dynamically Vulcanized Thermoplastic Elastomers", *Rubber Chemistry and Technology*, V. 69, No. 3, July-August 1996, and references cited therein. The addition of other polymeric components (for example, the SBC) and optional additives, fillers, oils, etc., is to be conducted to assure effective melt mixing but can be accomplished prior to, during, or subsequent to the rubber crosslinking reaction. Care should be taken such that interaction of the curative with such additional components is taken into account, and the reverse, interaction of the additives with the curing agents. Such selection is well within the skill in the art or can be determined empirically.

Those of ordinary skill in the art will appreciate the appropriate quantities and types of vulcanizing agents, and the conditions required to achieve the desired vulcanization. Any known crosslinking system can be used, so long as it is suitable under the vulcanization conditions for the elastomer component and it is compatible with the thermoplastic olefin polymer component of the composition. Crosslinking (curing) agents include sulfur, sulfur donors, metal oxides, phenolic resin systems, maleimides, peroxide based systems, hydrosilylation systems, high energy radiation and the like, both with and without accelerators and co-agents. The curative systems described in U.S. Pat. Nos. 6,207,752 and 6,291,587 are suitable, and are incorporated by reference.

The terms fully vulcanized or completely vulcanized as used herein mean that the olefin rubber component of the composition has been crosslinked to a state in which the elastomeric properties of the crosslinked rubber are similar to those of the rubber in its conventional vulcanized state, apart from the thermoplastic elastomer composition. Determination of fully vulcanized rubber can effectively be achieved by observing the time of the reduction from peak in the torque power required in the melt processing, cross-linking reaction. The degree of crosslinking (or cure) of the rubber can also be expressed in terms of gel content, crosslink density or amount of uncrosslinked rubber which is extractable by a rubber solvent. All of these descriptions are well known in the art. See, for example, U.S. Pat. Nos. 4,311,628 and 5,100,947. See also, "Crosslink Densities and Phase Morphologies in Dynamically Vulcanized TPEs", by M. Ellul, et al., RUBBER CHEMISTRY AND TECHNOLOGY, vol. 68, pp. 573-584 (1995).

Usually 5 to 20 parts by weight of the crosslinking agent or system are used per 100 parts by weight of the rubber component to be vulcanized.

Styrenic Block Copolymer (SBC) Thermoplastic Elastomer

The SBC thermoplastic elastomers useful in the invention are block copolymers of styrene/conjugated diene/styrene, with the conjugated diene optionally being fully or partially hydrogenated, or mixtures thereof. Generally this block copolymer may contain 10 to 50 weight %, more preferably 25 to 35 weight %, of styrene and 90 to 50 weight %, more preferably 75 to 35 weight % of the conjugated diene, based on said block copolymer. Most preferred, however, is a block copolymer which contains 28 to 35 weight % of styrene and 68 to 72 weight % of the conjugated diene. The conjugated diene is selected from butadiene, isoprene or mixtures thereof. Block copolymers of the styrene/conjugated diene/styrene type are SBS, SIS, SIBS, SEBS and SEPS, and SEEPS block copolymers.

These block copolymers useful in the adhesive compositions of the invention are known in the art, and are further described in Canadian Pat. No. 2,193,264 and in International Pat. Applications WO 96/20248; WO 96/23823; WO 98/12240; and WO 99/46330. They are generally prepared by butyl lithium initiated sequential anionic polymerization, but coupling of living S-B/S diblocks or bifunctional initiation are also known methods. See, in general, *Thermoplastic Elastomers* (2nd Ed.), Ch. 3, G. Holden, N. Legge, et al (Hanser Publishers, 1996).

Preferably, the SBC component can be a flexible block copolymer component, which is comprised of a block copolymer containing rigid blocks of vinyl aromatic monomers (S) and statistical, non-rigid mid-blocks of diene/vinyl aromatic monomers (B/S). These block copolymers contain at least the block structure S—B/S—S. The glass transition temperature (Tg) of block S is generally above 25° C. and that of the block B/S is generally below 25° C. The B/S block is composed of 75 to 30 weight percent vinyl aromatic monomer and 25 to 70 weight percent diene monomer. Particularly preferred flexible B/S blocks have a vinyl aromatic monomer content of 60 to 40 weight percent and a diene monomer content of 40 to 60 weight percent with respect to the total block copolymer component the diene content is less than 40 weight percent, preferably 35 weight percent, and the portion of the non-rigid B/S blocks amounts to at least 50 weight percent, preferably 70 weight percent. The block copolymer component has a low modulus and yield strength, with high elongation.

Suitable vinyl aromatic monomers include styrene, alkyl-substituted styrenes such as p-methylstyrene, vinyltoluene, as well as mixtures of said monomers. The preferred monomer is styrene. Suitable diene monomers include 1,3-butadiene, isoprene, piperylene, phenylbutadiene, and mixtures of said monomers. The preferred monomer is 1,3-butadiene. The conjugated diene monomer can also be fully or partially hydrogenated. This type flexible block copolymer is commercially exemplified in Styroflex® 2G66 (BASF A.G.).

The amount of the block copolymer component in the composition of the invention generally ranges from 3 to 25 weight percent, based on the total weight of the composition including the thermoplastic elastomer component, additives and the SBC component. The preferred amount of SBC ranges from 3 to 15 weight percent, with 5 to 10 weight percent being most preferred. Ranges above about 15 wt. % have shown significant agglomeration in the pelletized compositions of the invention. Such agglomeration can result in packaging and handling issues prior to and during the manufacture of the composite articles according to the invention.

Optionally the block copolymer may be further compounded with common additives, fillers, or oils, or mixtures thereof before or after adding to the thermoplastic elastomer composition. Thus, the styrenic thermoplastic elastomer optionally further comprises up to 60 weight % of the additives, based on the total weight of the block copolymer and the additives.

Compatibilizers

The adhesive compositions of the invention may optionally comprise one or more compatibilizing polymeric components that serve to provide increased compatibility between the thermoplastic polyurethane, the cross-linked rubber and/or the styrenic block copolymer. Such compatibilizers include block copolymers having one block that is compatible with one component and at least one other block that is compatible with at least one other of the three principal components. Such include the known block copolymers with a TPU block and an ethylene-alpha-olefin block or an SEBS block. Other examples would include functionalized polymers having a backbone polymer that is compatible with one of the principal components and a graft moiety that is either compatible or reactive with at least one of the other principal components. For example, maleated EPDM and maleated SEBS provide compatibility with their respective base polymer counterparts and the maleic acid/anhydride polar moiety is reactive with the thermoplastic polyurethane.

The compatibilizer will typically be present in a compatibilizing amount, e.g., from 3-20 wt. %, based upon the total weight of the composition, preferably 5-15 wt. %, and more preferably 5-10 wt. %.

The adhesive compositions of the invention have unexpectedly improved adhesion to thermoplastic polar substrates such as terpolymers of acrylonitrile, butadiene, and styrene (ABS), polycarbonate (PC), ABS/PC alloys and blends, polystyrene (PS), high impact polystyrene (HIPS), polyphenylene oxide (PPO), polymethyl methacrylate (PMMA), polybutylene terephthalate (PBT), polyethylene terephthalate (PET), acrylonltrile styrene acrylic (ASA), polysulfone (PSU), polyamide-imide (PAI), polyetherimide (PEI), including blends and alloys of these polymers, as well as glass and mineral filled versions hereof. The compositions therefore can be used in processes for making shaped articles by conventional processes such as co-injection molding, co-extrusion molding, co-blow molding (injection and extrusion), lamination, calendaring, overmolding by compression and injection, insert molding, and over-extrusion. The shaped articles obtained by these processes are multilayer articles comprising at least one layer of a polymer substrate and at least one layer of the adhesive composition according to the invention. The adhesive composition and the molded and shaped articles made therefrom are useful in a variety of applications such including, but not being limited thereto, non-slip grips, soft touch labels and coatings, and consumer electronic, tool and appliance parts.

EXAMPLES

The following general procedure was used in the preparation of thermoplastic elastomer examples of the invention that follow. The compositions were prepared either in a typical thermoplastic compounding twin screw extruder, or a Brabender laboratory mixer, although other conventional mixing devices such as Banbury mixers, Farrel continuous mixers and the like may also be used. For the twin screw extruder examples, the pellets of block copolymer were introduced with the thermoplastic polyurethane, the EPDM, clay, zinc oxide additive to the extruder using a loss-in-weight belt feeder near the beginning of the extruder. As melt blending proceeded, the silicon hydride co-catalyst was added, followed by the addition of the platinum catalyst in an oil solution. The extrusion was set up to reach a melt temperature of at least 180° C. but not higher than 220° C. One extruder vent was used as a vacuum port to remove trace volatiles and to prevent porosity in the extruded composition. The compositions were finished into spherical pellets using an underwater pelletizer. After pelletizing, the compositions were molded into plaques for the determination of physical properties or were molded as described below for use in the peel test.

The following measurement methods were used In evaluating the examples of the invention: Tensile strength at break ("UTS"); tensile modulus at 100% elongation (M100); elongation at break ("UE")—all in accordance with ASTM D412 (ISO 37, type 2); and, shore hardness—by ASTM D2240 ("Hardness).

Abbreviations and product names used in the tables are defined as follows:

| Tradename | Manufacturer | Description |
| --- | --- | --- |
| 1000-85 | Dow Chemical Company | Thermoplastic Polyurethane, 85 Shore A (Polyester Polycaprolactone based) |
| VX-1696 | ExxonMobil Chemical | 78 Mooney (MST), 100 phr oil-extended, 63% C2, 0.7% VNB |
| Styroflex® 2G66 | BASF AG | Flexible styrene-butadiene block copolymer |
| TUS5865 | Kuraray Co., Ltd. | Thermoplastic polyurethane-hydrogenated styrene block copolymer |
| Icecap K® Clay | Burgess Pigment | Anhydrous aluminum silicates |

-continued

| Tradename | Manufacturer | Description |
| --- | --- | --- |
| Zinc Oxide | Zinc Corp. of America | zinc oxide |
| Paralux® 6001R | Chevron | Paraffinic Oil |
| 2-5084 SiHi | Dow Chemical Company | Silicone Hydride |
| PC085 | United Chemical Tech., Inc. | Platinum/cyclic vinylsiloxane complex |
| Vector® 4111D | Dexco Polymers LP | Flexible styrene-isoprene block copolymer (SIS) |
| Septon® 2063 | Septon Co. of America | Flexible hydrogenated styrene-isoprene block copolymer (SEPS) |
| Septon® 8007 | Septon Co. of America | Flexible hydrogenated styrene-butadiene block copolymer (SEBS) |
| Cycolac® 5600 | General Electric (US) | Acrylonitrile-butadiene-styrene terpolymer ("ABS") |
| Lexan® PK 2640 | General Electric (US) | Polycarbonate resin ("PC") |

Adhesion of the compositions of the invention in Tables 1-2 was measured by a peel test modeled after ASTM D 1876, with the modification that a hard and soft substrate was used in place of two soft substrates. Also, since adhesion is obtained at the substrate interface due to the inventive composition, no separate adhesive layer exists. For evaluation of insert molding conditions the harder thermoplastic substrates were produced in an "L" shaped mold cavity with a nozzle injection temperature of 425° F. (218° C.), then were removed and allowed to cool to ambient temperature. The shaped plastic profile was then inserted into another mold with a "T" shaped cavity, so as to take up one-half of the cavity. The molten composition of the invention was then injection molded onto the existing "L" to produce a "T-bar" article. A standard tensiometer was then used to measure peel values for the "T-bars", by placing each tab of the upper "T" in separate grips. The grips were then pulled apart at 180 degrees. The force to peel was plotted against the crosshead travel which is also the peel length down the profile. The curve typically reached a peak and then descended to a plateau. The plateau values were recorded as the adhesion, expressed as pounds per linear inch (pli) Newton per meter (N/m).

Table 1 shows the formulations within the scope of the invention that vary the level of EPDM and block copolymer while leaving the TPU fixed. The blends also contain a compatibilizer, a TPU-SEBS copolymer. For the comparative example 8 adhesive compositions of the invention were prepared by blending 56.5 wt. % Santoprene® 8211-55W237 thermoplastic vulcanizate (Advanced Elastomer Systems) with 13 wt. % $CaCO_3$ filler, and 30.5 wt. % Styroflex® 2G66 flexible block copolymer in accordance with the disclosure of U.S. Patent Applic. No. 2003/0083434.

TABLE 1

| | Example # | | | | | | | |
|---|---|---|---|---|---|---|---|---|
| | 1 | 2 | 3 | 4 | 5 | 6 | 7 | 8 (Comp) |
| 1000-85 (TPU-p.cap) | 47.04 | 47.04 | 47.04 | 47.20 | 47.35 | 47.35 | 47.53 | — |
| VX 1696 Rubber | 43.97 | 43.97 | 43.97 | 31.86 | 19.67 | 19.67 | 7.4 | — |
| Icecap Clay | 2.64 | 2.64 | 2.64 | 1.91 | 1.18 | 1.18 | 0.44 | — |
| Zinc oxide | 0.44 | 0.44 | 0.44 | 0.20 | 0.20 | 0.07 | | — |
| TUS586 (TPU-SEBS) | 4.70 | 4.70 | 4.70 | 4.72 | 4.74 | 4.74 | 4.75 | — |
| Dow 2-5084 SiHi | 0.66 | 0.66 | 0.66 | 0.48 | 0.30 | 0.30 | 0.11 | — |
| PC085 (6001R oil, PC085 - 0.22 wt %) | 0.55 | 0.55 | 0.55 | 0.40 | 0.25 | 0.25 | 0.10 | — |
| Styroflex ® 2G66 | — | — | — | 13.11 | 26.31 | 26.31 | 39.60 | — |
| Comparative Example | — | — | — | — | — | — | — | 100.0 |
| Wt. % | 100.00 | 100.00 | 100.00 | 100.00 | 100.00 | 100.00 | 100.00 | 100.00 |

Adhesion to various polymeric substrates was tested by the insert molding technique described earlier. Results of the peel strength tests are set forth in Table 2. In the description of the adhesion mode, the notation "cohesive" means that peel or failure occurred in the body of either the substrate or the thermoplastic elastomer of the invention. The notation "adhesive" means that the peel or failure occurred at the interface between the substrate and the thermoplastic elastomer of the invention.

Table 2 shows some key physical properties obtained from the previously discussed formulations including adhesion to polycarbonate and ABS. Adhesion was tested on T-bars that were fabricated via cold insert molding. The thickness of both the substrate and test material is 0.060". Adhesion/M100 is a value that is calculated in an attempt to normalize the effects of hardness/modulus on adhesion.

The data shows that as the level of SBC (Styroflex® 2G66) is increased and the level of EPDM is decreased the bond strength increases even when adhesion is evaluated as a normalized parameter. The modes of failure also change as the SBC level increases. The comparative example #8 adhesion values are much lower than the other samples.

and the rotors turn at a speed of 100 rpm. The TPV was produced by initially mixing the rubber, followed by the addition of styrenic block copolymer and clay. After the material was homogenized by continued mixing for 2 minutes, the Brabender temperature was increased to 235° C. The platinum catalyst solution was then added followed by the silicon hydride about 30 seconds later. Curing, which was initiated by the addition of the silicon hydride, is allowed to proceed for approximately 2 minutes before the thermoplastic urethane is added. After the thermoplastic urethane had melted by continuous mixing for 2 minutes, the temperature was reduced to 180° C. and the batch was removed from the mixer. The removed batch was pressed flat and cut into test samples which were subsequently placed in the text mold for the following test, and cut into plaques for separate testing of physical properties.

Adhesion properties of the compositions shown in Tables 3 and 4 were measured by a peel test method modeled after ASTM D903-98. The only differences to this method were in sample preparation and conditioning. Since the inventive compositions bond to the engineering thermoplastic sub-

TABLE 2

| | Example # | | | | | | | |
|---|---|---|---|---|---|---|---|---|
| | 1 | 2 | 3 | 4 | 5 | 6 | 7 | 8 |
| Wt % SBC | 0 | 0 | 0 | 13 | 26 | 26 | 40 | 30.5 |
| Hardness (Sh A) | 60.9 | 60.1 | 61.6 | 66.5 | 73.3 | 73.6 | 80.2 | 58.8 |
| UTS (psi) | 1056 | 1014 | 983 | 1418 | 1714 | 2225 | 3323 | 597 |
| M100 (psi) | 315 | 313 | 313 | 376 | 436 | 443 | 525 | 200 |
| Adhesion/M100 (PC) (pli/psi) | * | * | * | 0.048 | 0.064 | 0.061 | 0.065 | 0.010 |
| Adhesion/M100 (ABS) (pli/psi) | 0.032 | 0.032 | 0.032 | 0.056 | 0.064 | 0.056 | 0.053 | 0.005 |
| Adhesion to PC (insert) 0.060" thickness (pli) | tab failure | tab failure | tab failure | adhesive 18 | adhesive 28 | adhesive 27 | adhesive 34 | adhesive 2 |
| Adhesion to ABS (insert) 0.060" thickness (pli) | adhesive 10 | adhesive 10 | adhesive 10 | adhesive 10 | adhesive 28 | adhesive 25 | adhesive 28 | adhesive 1 |

* Tab failure occurs on PC substrate until the SBC is added, The addition of SBC increases UTS which changes the failure mode and permits calculation of the normalized ratio.

The following general procedure was used in the preparation of adhesive compositions thermoplastic elastomers shown in Tables 3-4 of this invention. The process for making the vulcanized blend was carried out in a Brabender-Plasticorder (Model EPL-V5502) with a 85 mL mixer bowl capacity and cam rotors. The Brabender bowl was heated to 180° C.

strates without the use of adhesives, the samples were prepared by compression molding the adhesive compositions onto pre-cut strips of the thermoplastic substrate at a temperature of 400° F. (204.4° C.). The samples were conditioned for a minimum of 24 hours versus 7 days as specified by the ASTM D903-98 method.

TABLE 3

|  | Trial Number | | | | | | | | | |
|---|---|---|---|---|---|---|---|---|---|---|
| Formulations: | 5 | 6 | 7 | 8 | 9 | 10 | 11 | 12 | 13 | 14 |
| 1000-85 (TPU-p.cap) | 30.00 | 28.50 | 27.00 | 28.50 | 27.00 | 28.50 | 27.00 | 28.50 | 27.00 | 24.00 |
| VX 1696 Rubber | 27.34 | 25.97 | 24.60 | 25.97 | 24.60 | 25.97 | 24.60 | 25.97 | 24.60 | 21.87 |
| Icecap Clay | 1.64 | 1.56 | 1.48 | 1.56 | 1.48 | 1.56 | 1.48 | 1.56 | 1.48 | 1.31 |
| Zinc Oxide | 0.28 | 0.26 | 0.25 | 0.26 | 0.25 | 0.26 | 0.25 | 0.26 | 0.25 | 0.22 |
| W3 CaCO3 | | | | | | | | | | |
| TUS5865 (TPU-SEBS) | | | | | | | | | | |
| Vector ® 4111D | | 3.00 | 6.00 | | | | | | | |
| Septon ® 2063 | | | | 3.00 | 6.00 | | | | | |
| Septon ® 8007 | | | | | | 3.00 | 6.00 | | | |
| Exxelor ® VA-1803 | | | | | | | | | | |
| Dow 2-5084 SiHi | 0.41 | 0.39 | 0.37 | 0.39 | 0.37 | 0.39 | 0.37 | 0.39 | 0.37 | 0.33 |
| PC085 Catalyst Solution (6001R Oil/PC085@0.22%) | 0.34 | 0.32 | 0.31 | 0.32 | 0.31 | 0.32 | 0.31 | 0.32 | 0.31 | 0.27 |
| Styroflex ® 2G 66 | | | | | | | | 3.00 | 6.00 | 12.00 |
|  | 60.00 | 60.00 | 60.00 | 60.00 | 60.00 | 60.00 | 60.00 | 60.00 | 60.00 | 60.00 |

TABLE 4

|  | Trial Number | | | | | |
|---|---|---|---|---|---|---|
| Physical Properties: | 5 | 6 | 7 | 8 | 9 | Comments |
| Hardness | 49.0 | 47.0 | 48.0 | 49.0 | 46.0 | ISO Sh A |
| UTS | 343 | 293 | 225 | 254 | 264 | psi |
| UE | 212 | 207 | 105 | 156 | 150 | % |
| M100 | 256 | 223 | 222 | 271 | 240 | psi |
| Lab Adhesion | | | | | | Max. |
| Lab Method | 17 | 17 | 18 | 17 | 18 | Peel pli |
| PC | cohesive | cohesive | delam. | cohesive | cohesive | |
| PC Adhesion* | 0.066 | 0.076 | 0.081 | 0.063 | 0.075 | |
| Lab Adhesion | | | | | | Max. |
| Lab Method | 10 | 15 | 15 | 14 | 14 | Peel pli |
| ABS | cohesive | cohesive | cohesive | cohesive | cohesive | |
| ABS Adhesion* | 0.039 | 0.067 | 0.068 | 0.052 | 0.058 | |

|  | Trial Number | | | | | |
|---|---|---|---|---|---|---|
| Physical Properties: | 10 | 11 | 12 | 13 | 14 | Comments |
| Hardness | 52.0 | 53.0 | 57.0 | 58.0 | 61.0 | ISO Shore A |
| UTS | 327 | 293 | 436 | 563 | 606 | psi |
| UE | 199 | 176 | 167 | 199 | 185 | % |
| M100 | 288 | 267 | 351 | 400 | 438 | psi |
| Lab Adhesion Test | | | | | | Max. |
| Lab Method | 21 | 18 | 10 | 25 | 17 | Peel pli |
| PC | cohesive | cohesive | delam. | cohesive | cohesive | Comments |
| Normalized | 0.073 | 0.067 | 0.028 | 0.063 | 0.039 | |
| Lab Adhesion Test | | | | | | Max. |
| Lab Method | 12 | 17 | 15 | 18 | 21 | Peel pli |
| ABS | cohesive | cohesive | cohesive | cohesive | cohesive | Comments |
| Normalized | 0.042 | 0.064 | 0.043 | 0.045 | 0.048 | |

*Normalized

The same formulations shown in Table 3 were also prepared in a twin screw extruder as described previously in [0049] and test specimens were prepared and tested as described in [0050] and [0052]. The resultant data is summarized in Table 5. All samples in this table exhibited cohesive failure at or near the tab of the test specimens. Bond strength was determined by evaluating the maximum peel value at the time of failure.

TABLE 5

|  | Trial Number | | | | | |
|---|---|---|---|---|---|---|
| Physical Properties: | 5 | 6 | 7 | 8 | 9 | Comments |
| Hardness | 61 | 58 | 58 | 60 | 60 | ISO Shore A |
| UTS | 530 | 558 | 440 | 390 | 417 | psi |
| UE | 351 | 385 | 356 | 310 | 335 | % |
| M100 | 290 | 293 | 270 | 258 | 258 | psi |

TABLE 5-continued

| | Insert Molded Adhesion Test (0.060" thickness) | | | | | Max. |
|---|---|---|---|---|---|---|
| Insert Method | 15 | 23 | 15 | 20 | 23 | Peel pli |
| PC | cohesive | cohesive | cohesive | cohesive | cohesive | |
| Normalized PC Adhesion | 0.052 | 0.078 | 0.056 | 0.078 | 0.089 | |
| | Insert Molded Adhesion Test (0.060" thickness) | | | | | Max. |
| Insert Method | 22 | 23 | 19 | 24 | 24 | Peel pli |
| ABS | cohesive | cohesive | cohesive | cohesive | cohesive | |
| Normalized ABS Adhesion | 0.076 | 0.078 | 0.070 | 0.093 | 0.093 | |

| | Trial Number | | | | | |
|---|---|---|---|---|---|---|
| Physical Properties: | 10 | 11 | 12 | 13 | 14 | Comments |
| Hardness | 61 | 60 | 61 | 62 | 65 | ISO Shore A |
| UTS | 534 | 432 | 698 | 690 | 776 | psi |
| UE | 365 | 326 | 442 | 460 | 565 | % |
| M100 | 297 | 274 | 299 | 318 | 329 | psi |
| | Insert Molded Adhesion Test (0.060" thickness) | | | | | Max. |
| Insert Method | 28 | 22 | 30 | 31 | 29 | Peel pli |
| PC | cohesive | cohesive | cohesive | cohesive | cohesive | Comments |
| Normalized | 0.094 | 0.080 | 0.100 | 0.097 | 0.088 | |
| | Insert Molded Adhesion Test (0.060" thickness) | | | | | Max. |
| Insert Method | 28 | 23 | 31 | 33 | 33 | Peel pli |
| ABS | cohesive | cohesive | cohesive | cohesive | cohesive | Comments |
| Normalized | 0.094 | 0.084 | 0.104 | 0.104 | 0.100 | |

The invention claimed is:

1. An adhesive composition comprising
   (a) from 75 to 97 weight percent of the total composition of a thermoplastic vulcanizate comprising
      i) from 50 to 86.6 weight percent, based upon the weight of i) plus ii), of a thermoplastic polyurethane having a glass transition point less than 60° C.; and
      ii) from 13.4 to 50 weight percent, based upon the weight of i) plus ii), of an at least partially cross-linked rubber selected from butyl rubber, nonpolar rubber and rubber terpolymers of ethylene, propylene and a non-conjugated diene; and,
   (b) from 3 to 25 weight percent of the total composition of block copolymer comprising rigid blocks of styrene monomers and non-rigid blocks of 1,3-butadiene and styrene monomers containing at least the block structure S—B/S—S,
   wherein the adhesive composition is free of crystalline thermoplastic polyolefins.

2. The composition of claim 1 wherein said composition additionally comprises from 3 to 20 wt. % compatibilizer (c) based upon the total weight of the composition, wherein the compatibilizer provides increased compatibility between the thermoplastic polyurethane, the at least partially cross-linked rubber and/or the block copolymer.

3. The composition of claim 2 wherein said compatibilizer is selected from the group consisting of 1) a maleic-anhydride grafted EPDM, 2) a maleic-anhydride grafted block copolymer comprising a flexible styrene-ethylene/butene-styrene copolymer, and 3) a block copolymer comprising blocks of thermoplastic polyurethane and blocks of styrene-ethylene/butene-styrene.

4. The composition block copolymer of claim 1 wherein said block copolymer (b) comprises a diene content of less than about 40 weight percent of the total block copolymer and the non-rigid blocks B/S amount to at least about 50 weight percent of the total block copolymer.

5. The composition of claim 3 wherein said thermoplastic vulcanizate comprises an olefin rubber selected from the group consisting of ethylene-propylene copolymer rubber, ethylene-propylene-nonconjugated diene terpolymer rubber, and halogenated butyl rubber.

* * * * *